March 2, 1926.                   W. H. WEINRICH                   1,575,471
                           SPRING DEVICE FOR VEHICLES
                              Filed April 9, 1925
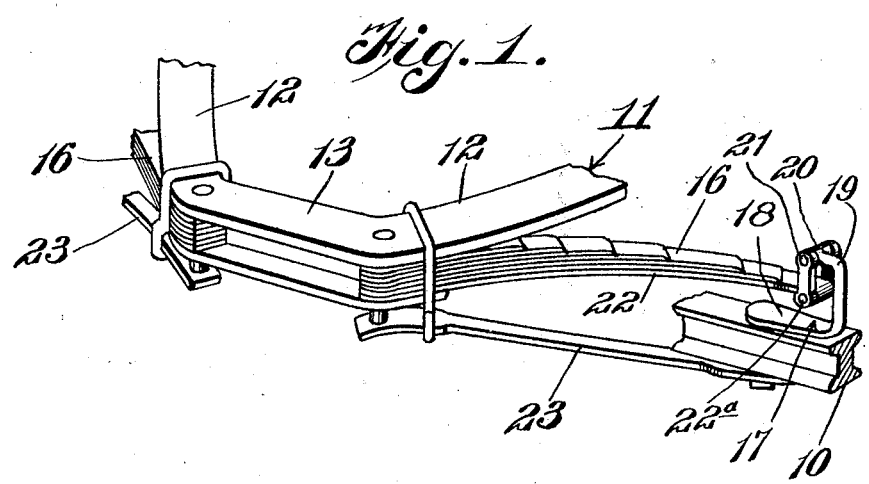
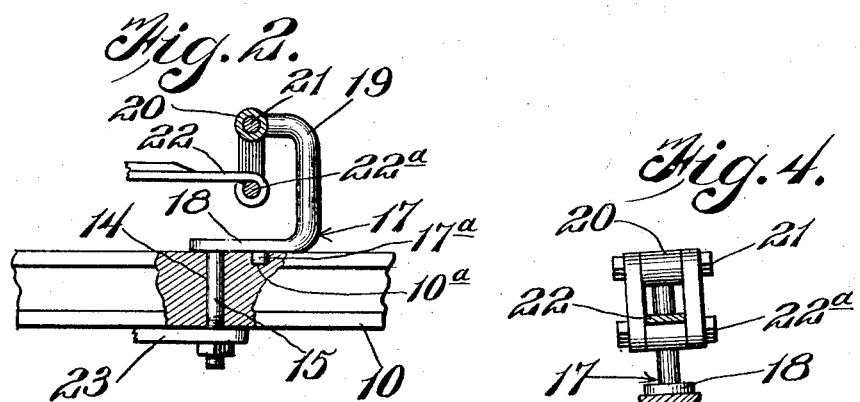
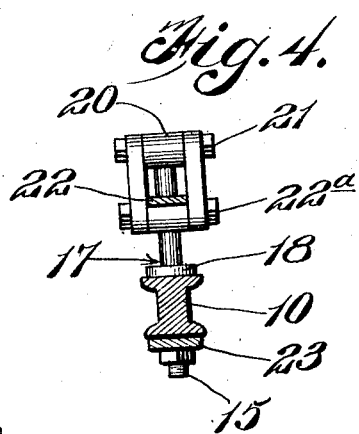
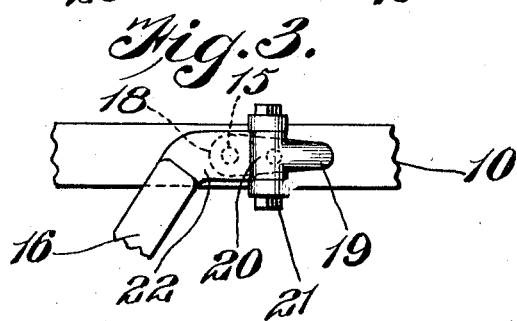
Inventor.
Walter H. Weinrich
By Watson E. Coleman
Attorney Patented Mar. 2, 1926.

1,575,471

UNITED STATES PATENT OFFICE.

WALTER H. WEINRICH, OF PUEBLO, COLORADO.

SPRING DEVICE FOR VEHICLES.

Application filed April 9, 1925. Serial No. 21,895.

*To all whom it may concern:*

Be it known that I, WALTER H. WEINRICH, a citizen of the United States, residing at Pueblo, in the county of Pueblo and State of Colorado, have invented certain new and useful Improvements in Spring Devices for Vehicles, of which the following is a specification, reference being had to the accompanying drawings.

This invention relates to spring devices for vehicles and more particularly to an improvement of that type of spring mounting for automobiles which embodies rearwardly diverging quarter-elliptic or semi-elliptic springs engaging the ends of the axle of the vehicle.

In this type of mounting the clevis or perch with which the end of the spring is engaged is usually arranged so that it extends transversely of the general longitudinal axis of the spring. This structure is faulty in that the existing rigid form of attachment of the springs to the axle does not permit the rear ends of the springs to separate under load or pressure as is the natural tendency of springs so disposed. Moreover, the distance between the rear ends of the springs being constant by the rigid form of attachment to the axle, a scissors movement of the springs takes place while in under load or pressure, this movement being resisted by the means of attachment with the result that there is a constant strain on the extending cross member of vehicle frame and as well a twisting strain upon the spring. An important object of the invention is accordingly the modification of such a spring mounting in such manner that the rear ends of the springs are directed longitudinally of the axle and a mounting for the springs is provided permitting freedom of action thereof and removal of strain therefrom.

A further object of the invention is to provide in such a mounting a construction such that the axle is given a slight tilt from from bottom to top toward the rear of the vehicle, it having been found that such tilting of the axle lends ease in steering the vehicle.

These and other objects I attain by the construction shown in the accompanying drawings, wherein for the purpose of illustration is shown a preferred embodiment of my invention and wherein:—

Figure 1 is a fragmentary perspective view showing a spring mounting constructed in accordance with my invention;

Figure 2 is a front elevation of the perch, the axle being partly broken away to show the mounting of the perch upon the axle;

Figure 3 is a plan view of the perch and the adjacent end of the spring; and

Figure 4 is a section taken through the spring and axle showing the inclination given the axle by the spring mounting.

Referring now more particularly to the drawings, the numeral 10 indicates the front axle of a vehicle and 11 the frame thereof having forwardly converging portions 12 terminating at a connection therebetween, designated at 13, and arranged in advance of the axle 10. Adjacent its outer ends, the axle has openings 14 for the passage of spring perch bolts 15.

In accordance with my invention, I mount on said forwardly converging frame sections quarter-elliptic springs 16, the butts of which are rigidly secured to the frame members and the rear ends of which approximate in spacing the spacing of the spring perch bolt openings 14. In these openings, I mount spring perch bolts by means of which a spring perch 17 is secured to the axle, this spring perch embodying a flattened portion 18 seating upon the axle and extending toward the ends thereof and having at its free end an upwardly and inwardly goose-neck 19 having at its end an eye 20 arranged longitudinally of the vehicle and transversely of the axle adapted for the reception of one bolt 21 of a spring shackle. The under surface of the perch 17 is formed with a lug 17ª entering a recess 10ª formed in the upper surface of the axle so that the perch is firmly held against possible rotation about the perch bolt 15 as an axis. The main leaf 22 of the spring, at its rear end, is angularly bent, extending transversely of the vehicle and having a longitudinally extending eye for the reception of the second bolt 22ª of this spring shackle. This eye, in addition to being disposed longitudinally of the vehicle, is inclined from front to rear so that its rear end lies nearer the ground level than its forward end, giving the axle the proper cant without strain on spring or vehicle cross-member.

Between the securing element of each spring perch and the securing element of the butt end of the associated spring, a trussbar 23 is disposed rigidly connected to each thereof and of such length that when the complete connection is effected, the axle 18 will incline rearwardly from its lower to its upper edges.

In a construction of this character, when pressure is applied to the body as in the application of weight thereto or in passing over a roughness, the set given to the springs will have its pressure applied longitudinally of the axle and will merely result in swinging of the shackles connecting the main leaves of the spring with their respective perches. Furthermore, the cant given to the axle will assist in steering. Since it is obvious that this structure is capable of a certain range of change and modification without materially departing from the spirit of my invention, I do not limit myself to such specific structure except as hereinafter claimed.

I claim:—

1. In a spring mounting for vehicles, a frame, rearwardly diverging springs having their butt ends secured to the frame, an axle arranged beneath the rear ends of the springs, the rear ends of the main leaves of each spring being disposed at an angle to the body of the spring and extending longitudinally of the axle and a perch carried by the axle adjacent each spring and connected with the angular end of the main leaf of the associated spring.

2. In a spring mounting for vehicles, a frame, rearwardly diverging springs having their butt ends secured to the frame, an axle arranged beneath the rear ends of the springs, the rear ends of the main leaves of each spring being disposed at an angle to the body of the spring and extending longitudinally of the axle, a perch carried by the axle adjacent each spring and connected with the angular end of the main leaf of the associated spring, said perch embodying a portion flatly abutting the axle, a bolt extending through the axle securing the perch in position and a lug entering the axle in spaced relation to the bolt to maintain the perch against shifting on the axle, the connection between the spring and perch including a swinging shackle.

3. In a spring mounting for vehicles, a frame, rearwardly diverging springs having their butt ends secured to the frame, an axle arranged beneath the rear ends of the springs, the rear ends of the main leaves of each spring being disposed at an angle to the body of the spring and extending longitudinally of the axle, a perch carried by the axle adjacent each spring and connected with the angular end of the main leaf of the associated spring, said perch embodying a portion flatly abutting the axle, a bolt extending through the axle securing the perch in position, a lug entering the axle in spaced relation to the bolt to maintain the perch against shifting on the axle, the connection between the spring and perch including a swinging shackle, and a connection between each bolt and the frame at the point of attachment of the butt end of the associated spring proportioned with relation to said spring to maintain the axle canted rearwardly from the bottom to the top thereof, the angular bent end of the main leaf of spring having an eye extending longitudinally for engagement with the shackle, said eye being inclined downwardly from front to rear.

In testimony whereof I hereunto affix my signature.

WALTER H. WEINRICH.